R. T. VAN VALKENBURG.
BEE-HIVE.
No. 184,809.
Patented Nov. 28, 1876.
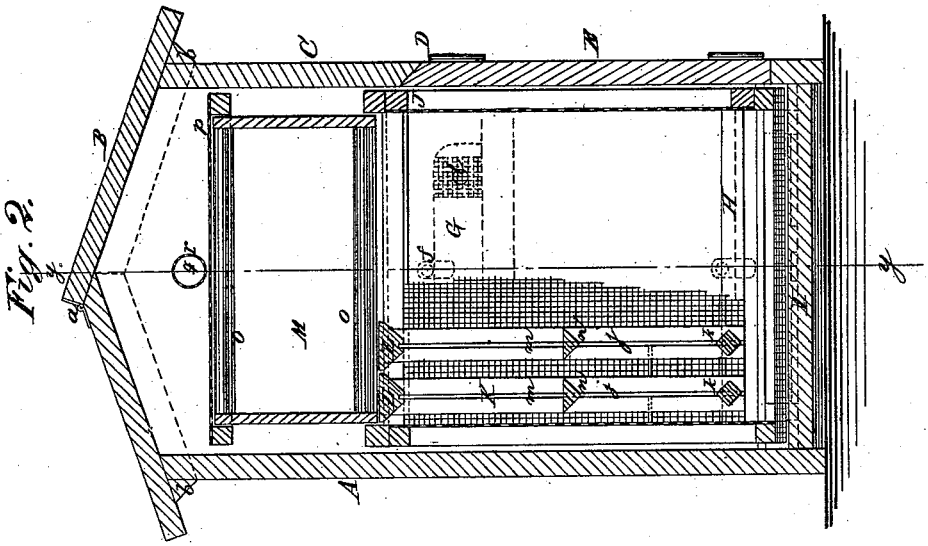
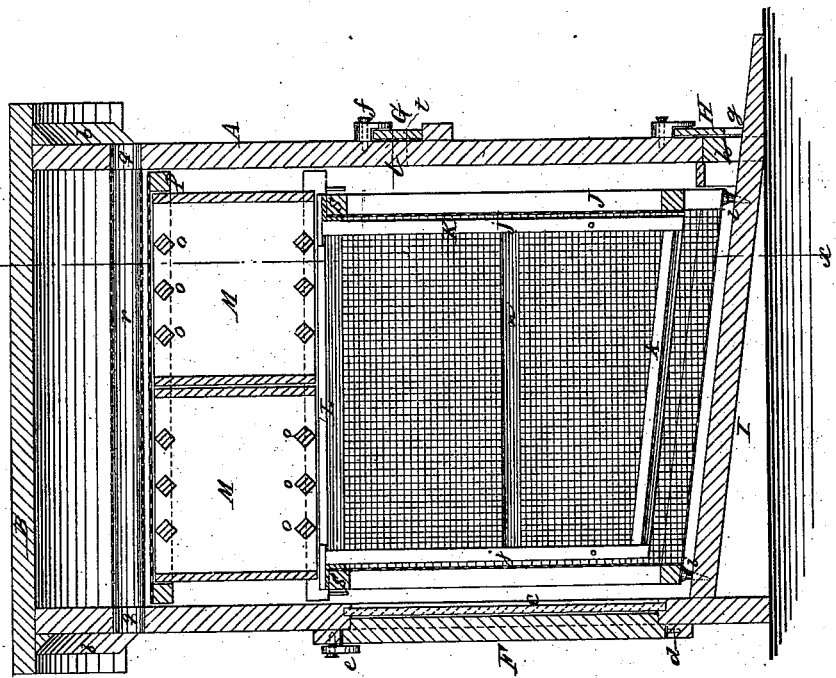
WITNESSES:
H. Rydquist.
John Goethals.
INVENTOR:
R. T. Van Valkenburg
BY
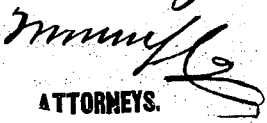
ATTORNEYS.
N. PETERS, PHOTO-LITHOGRAPHER, WASHINGTON, D. C.

UNITED STATES PATENT OFFICE.

RANDALL T. VAN VALKENBURG, OF ANGOLA, INDIANA.

IMPROVEMENT IN BEE-HIVES.

Specification forming part of Letters Patent No. 184,809, dated November 28, 1876; application filed August 28, 1876.

*To all whom it may concern:*

Be it known that I, RANDALL T. VAN VALKENBURG, of Angola, in the county of Steuben and State of Indiana, have invented a new and Improved Bee-Hive, of which the following is a specification:

Figure 1 is a central vertical section on line $y\ y$ in Fig. 2. Fig. 2 is a vertical section on line $x\ x$ in Fig. 1.

Similar letters of reference indicate corresponding parts.

The invention will first be described in connection with the drawing, and then pointed out in claims.

A is the main portion of the hive, having a gable roof, one-half of which, B, is movable and hinged at $a$ to the other half. A part, C, of the side D is attached to the hinged part of the roof, so that it may open with it. Beveled pieces of wood $b$ are fastened under the edges of the boards forming the roof, against the sides of the hive, to prevent the moth from depositing eggs in crevices under the roof. The lower portion E of the side D is hinged at the corner of the hive, forming a door. F is a door in the side of the hive that covers the window $c$, and is retained by the dowels $d$ and button $e$. G is the robber-door, that is held in place by the button $f$, and is removable at pleasure. It is provided with apertures $t$, covered with wire gauze, that correspond with apertures $l$ in the hive.

H is a door for cleaning the hive, which is provided with an aperture, $g$, through which bees may pass. A piece of wood, $h$, having a contracted aperture for excluding robbers, is placed behind the door H. I is the bottom of the hive, which is inclined downward toward the door H. J is a frame covered with wire cloth, having the same form as the lower portion of the hive, but is made smaller, so as to have a space around it, between it and the sides of the hive. It is supported a small distance from the bottom of the hive by the screws $i\ i$. The side contiguous to the door E is removable. The upper edges of the front and rear parts of the frame J are covered with sheet rubber $s$ to prevent the bees from depositing wax at that point.

K K are frames consisting of triangular cross-pieces L, which rest on the rubber at the top of the frame J, and the vertical pieces $j$ that hang from the cross-pieces L, forming the sides of the frame, and the square bars $k$ that form the bottoms of the frames. The sides and top of the frames K are provided with a narrow groove, $m$. $n$ is a triangular cross-bar having tenons that fit in the grooves in the vertical pieces $j$. The bottom bar $k$ is placed with one of its angles uppermost.

These frames, when inclosed by the gauze-covered frames J, form the living and breeding apartment for the bees. It also forms a place for storage for the winter's supply of honey.

M M are surplus boxes for receiving the surplus honey made during the summer season. They are open at the top and bottom, and provided with the bars $o$, and rest on the cross-bars L. A wire-gauze screen, $p$, is placed over the surplus-boxes. Apertures $q$ are made in the sides of the hive, and connected by a tube, $r$, made from wire-gauze.

The bees enter and leave at the aperture $g$, or if it is desirable to admit them directly into the upper portion of the hive, they may be allowed to pass in at $l$ by removing the door G. The bees in passing in and out over the inclined bottom of the hive stir the refuse matter in the hive so that it is gradually worked out.

In the winter the surplus-boxes M are removed, and the screen $p$ is placed over the top of the frame J, and the upper portion of the hive and the spaces at the sides around the frame J are filled with pieces of dried corn-cobs, which absorb the breath of the bees and prevent them from freezing.

Having thus described my invention, I claim as new and desire to secure by Letters Patent—

1. The door H of a bee-hive, having a rear piece, $h$, with a contracted aperture, as and for the purpose set forth.

2. The breeding apartment of a bee-hive, consisting of the wire-cloth frame and the frames K K, the latter supported at top of the former upon rubber, as and for the purpose described.

3. The end-open honey-boxes M covered at top with wire gauze, provided with bars $o$, and supported on the cross-bars L, substantially as and for the purpose specified.

RANDALL T. VAN VALKENBURG.

Witnesses:
    WILLIAM G. CROXTON,
    P. W. RUSSELL.